United States Patent [19]

Frigo

[11] Patent Number: 5,504,606
[45] Date of Patent: Apr. 2, 1996

[54] LOW POWER OPTICAL NETWORK UNIT

[75] Inventor: Nicholas J. Frigo, Atlantic Highlands, N.J.

[73] Assignee: AT&T Corp., Murray Hill, N.J.

[21] Appl. No.: 252,463

[22] Filed: Jun. 1, 1994

[51] Int. Cl.⁶ .................................................. H04B 10/20
[52] U.S. Cl. ............................................. 359/118; 359/168
[58] Field of Search ............................. 359/154, 118, 359/120–121, 157, 167–168, 189, 171, 194, 125, 128, 152; 370/32; 455/38.3; 379/413; 250/205

[56] References Cited

U.S. PATENT DOCUMENTS

| | | | |
|---|---|---|---|
| 4,449,043 | 5/1984 | Husbands | 250/205 |
| 4,946,244 | 8/1990 | Schembri | 359/157 |
| 5,095,382 | 3/1992 | Abe | 359/189 |
| 5,162,935 | 11/1992 | Nelson | 359/171 |
| 5,189,543 | 2/1993 | Lin et al. | 359/154 |
| 5,337,175 | 8/1994 | Ohnsorge et al. | 359/125 |

Primary Examiner—Leo Boudreau
Assistant Examiner—Kinfe-Michael Negash

[57] ABSTRACT

An optical network unit for use in a switched passive optical network utilizes the high contrast ratio between the energies of optical ringing signals and optical interrogation signals. The receiver of the optical network unit is operated in a low power mode of operation until communication between the central office and subscriber is desired. In the low power mode, a photodetector runs in a photovoltaic mode to charge a sensing capacitor. An optical ringing signal originating in the central office when communication via the ONU is desired creates a voltage signal which is detected by a comparator circuit. When the comparator triggers, it switches on the receiver and directs the output of the photodiode to the receiver for processing of the communication signals received therefrom. On completion of the call, the ONU is returned to the low power state. When an off-hook signal is detected, the ONU interrupts the interrogation signals, thereby indicating to the central office that subscriber initiated communication via the ONU is desired.

19 Claims, 2 Drawing Sheets

LOW POWER OPTICAL NETWORK UNIT

BACKGROUND OF THE INVENTION

1. Field of the Invention

This invention relates generally to optical communication and, more particularly to an optical network unit for use in switched networks.

2. Description of the Prior Art

There are two general classes of optical communication network architectures—broadcast and switched. In a broadcast network architecture, each fiber line from the Central Office (CO) feeds a corresponding large group of subscribers. Specifically, all of the optical information carried by a fiber line is presented to each subscriber's receiver or Optical Network Unit with Time Division Multiplexing (TDM) being used to distinguish the channels.

It has, for example, been proposed to utilize a broadcast structure in a Passive Optical Network (PON), an optical fiber network in which there are no active components between the central office (CO) and the subscriber's terminal equipment. The passive splitter-based network disclosed therein utilizes a "double star" broadcast structure in which fibers comprising the first star leave the CO in all directions and deliver optical information to the secondary stars. Each secondary star or Remote Node contains a star coupler which further distributes all of the optical information to either another level of stars or to Optical Network Units (ONUs) in the immediate locale. In all, each fiber line from the CO will feed as many as 128 subscribers.

It will be readily appreciated by those skilled in the art that since every subscriber to a network using a broadcast structure receives all the information destined for all subscribers, each subscriber's receiver or ONU must continually or periodically monitor the bus for network management. That is, the subscriber may have to respond to "ringing" signals, requests for status monitoring, interrogations, and the like, that are unscheduled. Consequently, the ONU can never be entirely "asleep" at any time, but rather must always be functioning at some marginal level at all times, even in the quiescent (or "Q") state. As a result, the ratio of the "on" power consumption to quiescent power consumption, $P_{ON}/P_Q$, is not very high, with typical values ranging from 2–6. It is therefore necessary to provide each ONU with back-up batteries having an energy storage capacity comparable to full operation for eight hours, even for an inactive network, so as to avoid an interruption in service in the event of a power failure.

The other general class of optical network structures is the switched network structure. In a switched network, the ONU/receiver associated with a particular subscriber receives only the optical information intended specifically for it. A PON system utilizing a switched configuration, for example, is proposed in U.S. patent application Ser. No. 08/029,724 filed on Mar. 11, 1993, entitled OPTICAL NETWORK BASED ON REMOTE INTERROGATION OF TERMINAL EQUIPMENT and assigned to the assignee herein, AT&T Corporation. In the aforementioned application, the disclosure of which is expressly incorporated herein by reference, wavelength-division-multiplexing (WDM) techniques are utilized in which the signals are split at the RN based on the wavelength of light, with light of a given wavelength being directed to a specific ONU.

It would be desirable to provide an ONU configured to exploit one of the properties of a switched optical network vs. a broadcast optical network. Specifically, in contrast to a broadcast optical network, the mere presence or absence of light in a fiber feeding a switched network ONU may be characterized as a "bit" of information, since the presence of light signifies that a particular ONU is being addressed. This characterization is, in fact, true of all switched networks, not just optical networks. Accordingly, it should be understood that the ONU of the present invention may also be employed in hybrid systems in which the signals are transmitted both by wire and fiber.

More particularly, it would be desirable to provide an optical network unit which may be readily switched from a power conserving quiescent mode to a normal operating mode when the presence of light is detected and in which the need for the ONU to detect light at the line rate or to employ special filtering techniques is obviated when responding to a "wake-up" call.

SUMMARY OF THE INVENTION

In accordance with the present invention, an optical network unit for use in a switched network utilizes the "bit" of information represented by the presence or absence of light in the fiber to toggle a switch, thereby determining whether the ONU is operated in a quiescent mode or in an operating or "power on" mode.

The unit is configured to receive optical pulses via a suitable transmission medium such as an optical fiber and to present information corresponding to the pulses to at least one subscriber, and comprises light detecting means for detecting optical pulses carried by the optical fiber and for converting the optical pulses into electrical signals corresponding thereto, receiving means for receiving the electrical signals and for supplying corresponding signals to the at least one subscriber, and control means responsive to the light detecting means for supplying power to the receiving means to switch into an operational mode and for interrupting power to the receiving means to return to a low power quiescent mode.

In accordance with an illustrative embodiment of the present invention, the light detecting means is a photodiode coupled to the receiver means during the operating mode and coupled during the quiescent mode to means for recognizing receipt of a call request signal carried by the optical fiber. The recognizing means includes a comparator operable during the quiescent mode to receive an output voltage from the photodiode electronics indicative of light energy incident thereon and to compare the output voltage to a reference voltage, whereby a call request signal is recognized when the output voltage exceeds the reference voltage.

In accordance with one aspect of the present invention, the control means is responsive to the comparator to supply power to the receiving means when the reference voltage is exceeded by the output voltage, thereby initiating the operating mode.

Switching means are included for coupling the photodiode to the receiving means, thereby permitting operation of the receiving means in accordance with the operating mode, and for coupling the photodiode to the comparator for operation of the recognizing means during the quiescent mode.

In accordance with another aspect of the present invention, the recognizing means further includes a low pass RC filter coupled to an input of the comparator, the photodiode being connectable across the low pass RC filter to permit charges corresponding to optical ringing pulses incident on the photodiode to accumulate until the reference voltage is exceeded. Preferably, power dissipative means are also provided to prevent the accumulation of charges corresponding to optical interrogating pulses incident on the photodiode. The light energy ratio between the ringing pulses and the interrogating pulses is different from unity and is preferably much greater than one. As will be readily appreciated by those skilled in the art, the desired light energy ratio may be obtained by utilizing interrogation pulses which are shorter in duration of similar intensity than those of the call request signal. Alternatively, however, the same results can be achieved by utilizing higher intensity pulses for the call request signal. In either case, the energy supplied by the interrogation pulses will be insufficient to initiate operation of the receiver.

A switched, passive optical network constructed in accordance with the present invention includes a central office having means for supplying optical pulses, including ringing and interrogating pulses, to an optical fiber, a remote node coupled to the optical fiber for accepting the optical pulses and for directing selected pulses to respective optical fibers, and at least one optical network unit. Each of the optical network units is configured to receive the optical pulses via one of the respective optical fibers and to present information corresponding to received pulses to at least one subscriber, and includes light detecting means for detecting optical pulses carried by the optical fiber and for converting the optical pulses into electrical signals corresponding thereto, receiving means for receiving the electrical signals and for supplying corresponding signals to the at least one subscriber, and control means responsive to the light detecting means for supplying power to the receiving means in an operating mode and for interrupting power to the receiving means in a low power quiescent mode.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

Figure 1:
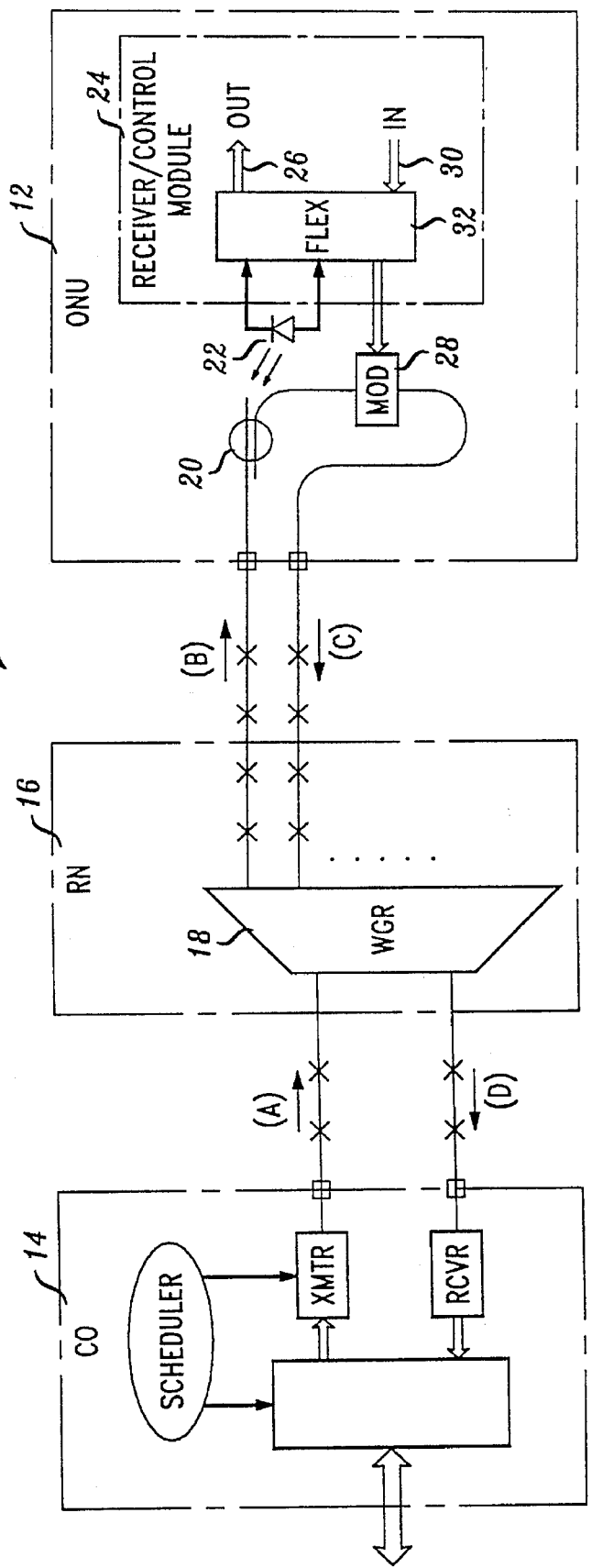
Figure 2:
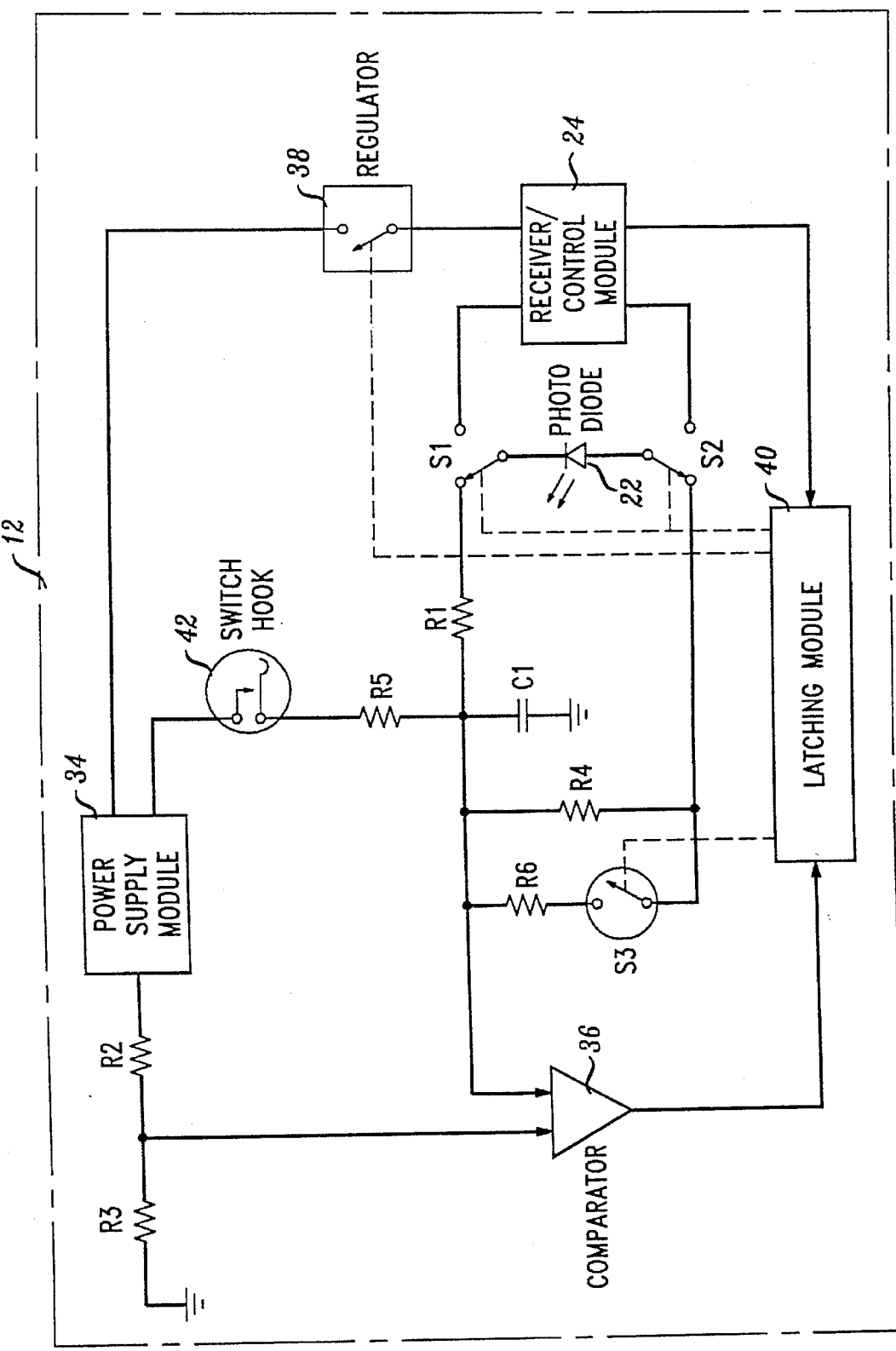

In the drawings, wherein like reference characters denote similar elements throughout the several views:

FIG. 1 is a block schematic diagram depicting an illustrative example of a switched passive optical network utilizing the optical network unit of the present invention; and FIG. 2 is a detailed block schematic diagram of an optical network unit constructed in accordance with the teachings of the present invention.

DETAILED DESCRIPTION OF THE PRESENTLY PREFERRED EMBODIMENTS

As indicated above, the optical network unit (ONU) of the present invention may be used in a switched network, such as, for example, a switched optical network, and is operable in a power conserving quiescent mode until the presence of light on a fiber feeding the subscriber receiver is detected. Thus, in FIG. 1, there is shown a block diagram of an illustrative switched passive optical network 10 utilizing an ONU 12 constructed in accordance with an illustrative and currently preferred embodiment of the present invention. Although the operation of ONU 12 is described herein in connection with a switched passive optical network, such description is for illustrative purposes only and it should be understood that the novel ONU of the present invention may be utilized with any type of switched network.

The three major blocks in FIG. 1 are the ONU 12, a central office (CO) 14, and remote node (RN) 16. The CO communicates with many RNs (only one of which is shown) in, for example, a star architecture, and each RN in turn serves a plurality of ONUs (only one of which is shown), also (by way of example) in a star configuration.

A supervisory circuit insures that the data signals appropriate to each ONU are sent in the prescribed wavelength. At the RN 16, the signals for each ONU are separated by a wavelength selective device, such as a wavelength grating router (WGR) 18. After leaving the RN, the modulated signal proceeds along the downstream fiber to the appropriate ONU such as ONU 12, where it is split by a passive tap coupler 20 which may, for example, have a 5–10:1 splitting ratio.

The smaller portion (i.e. 10%–20%) of light leaving the coupler 20 is used as the received signal. In a manner to be hereinafter described, the light is detected and converted by a photodiode 22, and conditioned by a receiver/control module 24 to become the ONU's electrical output of the downstream information for delivery to the subscriber via an output terminal 26. The remainder of the incoming light enters a "loop-back" to the CO 14, and begins its return journey when it is directed by the tap coupler 20 to a modulator 28. The modulator 28 may, for example, be configured as an intensity modulator or as a subchannel modulator. As will be appreciated by those skilled in the art, the light entering the modulator 28 may be utilized as a "carrier" for the upstream optical information supplied from the subscriber as electrical signals via an input terminal 30. In a conventional manner, the information received from the subscriber via input terminal 30 is buffered and conditioned by the electronics module 32 of receiver/control module 24. Upon receipt of a downstream trigger signal, the contents of the message buffer are sent to the modulator 28.

In the above-described example, only that portion of light directed towards ONU 12 is incident on photodiode 22 as the downstream signal, while the remaining portion is overmodulated with an upstream signal and routed back to the CO. As will be readily understood by those skilled in the art, operation of the receiver/control module 24 is only necessary when communication between the ONU subscriber and the CO is desired. A considerable reduction in power consumption may therefore be achieved by "switching off" the receiver module 24 unless and until further optical communication is to be established between the ONU and CO.

With reference now to FIG. 2, an illustrative embodiment of an ONU 12 operable in a quiescent or low power mode of operation, in which power to the receiver module may be switched on and off, will now be described. As shown in FIG. 2, photodiode 22 is connected in photovoltaic mode and is configured to receive optical signals from the CO. ONU 12 further includes a power supply module 34 that supplies power to receiver/control module 24.

The CO may be adapted to continually monitor the ONU 12 for call setup requests by sending an inquiry light pulse at selected intervals, e.g. every 125 μsec. In the context of telephone services, for example, the modulator may communicate an "on-hook" condition to the CO by returning the inquiry pulse to the CO. In any event, to prevent the inquiry pulse from triggering full power operation of receiver module 24 the illustrative ONU of FIG. 2 utilizes a low pass filter and a comparator circuit, which will now be described. Comparator 36 receives a reference voltage from the power supply module 34 via a voltage divider consisting of resistors R2 and R3.

In a low power mode of operation, switches S1 and S2 are in the positions shown, placing the output of photodiode 22 across a low pass filter consisting of capacitor C1 and resistor R1. The output of the low pass filter is supplied to the sensing input terminal of comparator 36. So long as little or no light, or only low intensity light is incident on photodiode 22, the current generated by the photodiode 22 remains negligible and resistor R4 prevents the accumulation of charge in capacitor C1. Powered up operation of the receiver/control module 24 is thus prevented until the voltage sensed by comparator 36 exceeds the reference voltage.

It will be observed that in the low power mode, no power is consumed by receiver/control module 24 because a regulator circuit 38, which is controlled by a latching module 40 in a manner yet to be described, is open. Thus, only comparator 36 and reference chain R2 and R3 draws current during the low power mode. Circuits such as the comparator 36 shown in FIG. 2 are commercially available and relatively inexpensive, with operating power consumptions on the order of microwatts.

In accordance with the illustrative embodiment depicted in FIG. 2, communication between the CO and subscriber is initiated from the downstream end when the CO supplies an optical "ringing" signal to photodiode 22. Such a ringing signal may for example be characterized as a long packet which fills the entire time slot allotted to the ONU. Over one or several 125 μsec cycles, the photocurrent charges up capacitor C1 so that the voltage applied to the sensing terminal of comparator 36 exceeds the threshold voltage. It is contemplated that the ratio of light energy in the "wakeup" pulses to that in the "inquiry" or interrogating pulses described above will be on the order of several hundred. Thus, the "off-hook" interrogation will not be mistaken for a ringing signal.

Additionally, upstream communication may be initiated from the subscriber end when hook switch 42 closes, thus indicating an off-hook condition. A voltage exceeding the comparator threshold is applied to comparator 36, via resistor R5, capacitor C1, and resistor R4, upon the closure of hook switch 42.

In either of the aforementioned situations in which the comparator threshold is exceeded, an output signal is supplied by comparator 36 to latching module 40. Latching module 40, which may utilize either digital or analog switch components, initiates a sequence of several operations in order to "wake up" or energize the ONU. In accordance with a digital configuration, latching module 40 outputs a control signal to regulator 38, thereby closing the regulator circuit and connecting power supply 34 to receiver/control module 24. A signal is also output to change the state of switches S1 and S2, thereby connecting the photodiode 22 to the receiver/control module 24, waking up the receiver. This permits subsequent optical signals from the CO to be decoded as information. Also, the output of comparator 36 is disabled for the duration of the call. In the illustrative embodiment depicted in FIG. 2, receiver/control module 24 supplies a control signal to an input terminal (not shown) of power supply module 34 in order to interrupt the supply of power to the comparator 36.

When receiver/control module 24 determines that communication between the CO and subscriber has been terminated, the ONU 12 is returned to the low power mode. Photodetector 22, which had been receiving information from the CO, must now return to the quiescent state and resume its role of monitoring the line for calls from the CO. To this end, the latching module 40 responds to a "GO TO OFF" signal from the receiver/control module 24 by supplying appropriate control signals to switches S1, S2 and S3. After capacitor C1 discharges across resistor R6, switch S3 is reopened. The ONU 12 is thus returned to the low power state and the CO begins its routine interrogation, monitoring the return optical signals for an interruption indicative of another call.

Because it is expected that the ONU will be operating in the low power mode the majority of the time, it is contemplated that significant savings in power consumption, battery capacity, and backup operations can be achieved for any switched passive optical network (PON). It is contemplated that quiescent power consumption in the microwatt range may be readily achieved. Moreover, in the illustrative switched PON depicted in FIG. 1, modulators are used instead of upstream lasers to supply the return signals to the CO. Although it is advantageous to employ the ONU of the present invention in any switched PON, including one utilizing upstream lasers, several additional benefits are associated with the use of upstream modulators. First, the modulator is likely to require far less power than a laser. Second, the modulator is more likely to be able to "wake up" in a very short period of time, as compared to a laser. Third, a modulator is likely to attain an operating equilibrium more quickly than a laser.

Regardless of the specific type of switched network in which the ONU of the present invention is employed, the overall power savings provided will significantly reduce the costs associated with the capacity and size of the backup battery.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An optical communication network unit for use in a switched network, said unit bring configured to receive optical signals including call request signals via an optical medium and to present information borne by said optical signals to at least one subscriber, comprising:

light detecting means for detecting optical signals carried by the optical medium and for converting said optical signals into corresponding electrical signals;

receiving means for receiving said electrical signals and for supplying the corresponding signals to the at least one subscriber; and control means responsive to said light detecting means and comprising a recognizing means coupled to said light detecting means and responsive to said call request signals, said control means causing power to be delivered to said receiving means to enable operating said receiving means in an operating mode upon receipt of said call request signals and for returning said receiving means to a low power quiescent mode.

2. The optical network unit of claim 1, wherein said light detecting means comprises a photodiode.

3. The optical network unit of claim 1, wherein said light detecting means is coupled to said receiver means during said operating mode.

4. The optical network unit of claim 1, wherein said recognizing means comprises a comparator operable during said quiescent mode to receive an output signal derived from said light detecting means indicative of light energy incident thereon and to compare said output signal to a reference signal level for recognizing a call request signal when said output signal exceeds said reference signal level.

5. The optical network unit of claim 4, wherein said reference signal is a reference voltage and said output signal is an output voltage, said control means being responsive to said comparator to supply power to said receiving means when said reference voltage is exceeded by said output voltage to thereby initiate said operating mode.

6. The optical network unit of claim 4, further comprising switching means for coupling said light detecting means to said receiving means to thereby initiate operation of the optical unit in the operating mode and for coupling said light detecting means to said recognizing means during the quiescent mode.

7. The optical network unit of claim 4, wherein said recognizing means further comprises a low pass filter coupled to an input of said comparator, said light detecting means being connectable across said low pass filter to permit charges corresponding to optical ringing signals incident on said light detecting means to accumulate until said reference signal level is exceeded.

8. The optical network unit of claim 7, further comprising dissipative means coupled to said light detecting means for substantially preventing charges corresponding to optical interrogating signals from causing said comparator to initiate operation of said control means.

9. The optical network unit of claim 8, wherein a light energy ratio between said ringing signals and said interrogating signals is greater than unity.

10. The optical network unit of claim 8, wherein said recognizing means is further operable to detect a telephone off-hook signal, said control means being responsive to said recognizing means to interrupt said interrogation signals upon detection of an off-hook signal.

11. The optical network unit of claim 1, further comprising a power supply for supplying power to said receiving means and switching means responsive to a control signal output from said control means for coupling said power supply to said receiving means to thereby enable operation of said receiving means.

12. The optical network unit of claim 1, wherein said optical signals are pulses.

13. The optical network unit of claim 1, wherein said light detecting means is operated as a current source.

14. The optical network unit of claim 1, wherein said light detecting means is operated as a voltage source.

15. A switched, passive network, comprising:

a central office including means for supplying optical signals, including ringing and interrogating signals, to an optical medium;

a remote node coupled to said optical medium for receiving said optical signals and directing selected signals to respective optical media; and at least one optical network unit, each of said optical network units being configured to receive said optical signals via one of said respective optical media and to present information corresponding to received signals to at least one subscriber, said optical network including:

light detecting means for detecting optical signals carried by an associated optical medium and for converting said optical signals into corresponding electrical signals;

receiving means for receiving said electrical signals and for supplying the corresponding signals to the at least one subscriber; and control means responsive to said light detecting means for supplying power to said receiving means in an operating mode and for interrupting power to said receiving means in a low power quiescent mode.

16. The switched, passive network according to claim 15, said optical network unit further comprising recognizing means coupled to said light detecting recognizing means during said quiescent mode for recognizing receipt of a call request signal carried by said associated optical medium.

17. The switched, passive network according to claim 16, wherein said recognizing means comprises a comparator operable during said quiescent mode to receive an output signal derived from said light detecting means indicative of light energy incident thereon and to compare said output signal to a reference signal level for recognizing a call request signal when said output signal exceeds said reference signal level.

18. The switched, passive network according to claim 17, wherein said output signal is an output voltage and said reference signal level is a reference voltage, said control means being responsive to said comparator to supply power to said receiving means when said reference voltage is exceeded by said output voltage to thereby initiate said operating mode.

19. The switched, passive network according to claim 17, further comprising switching means for coupling said light detecting means to said receiving means to initiate operation in the operating mode and for coupling said light detecting means to said recognizing means during the quiescent mode.

* * * * *